United States Patent
McColl

[15] 3,704,733
[45] Dec. 5, 1972

[54] DEBARKING AND DEBRANCHING APPARATUS

[72] Inventor: Bruce John McColl, Whitby, Ontario, Canada

[73] Assignee: Owens-Illinois, Inc.

[22] Filed: Oct. 7, 1970

[21] Appl. No.: 78,764

Related U.S. Application Data

[63] Continuation-in-part of Ser. No. 572,530, Aug. 15, 1966, Pat. No. 3,533,458.

[52] U.S. Cl. ............................... 144/2 Z, 144/208 E
[51] Int. Cl. .......................................... A01g 23/02
[58] Field of Search ......... 82/59, 60, 67, 68; 144/2 Z, 144/208 R, 208 E

[56] References Cited

UNITED STATES PATENTS

| | | | |
|---|---|---|---|
| 205,527 | 7/1878 | Cohen | 82/67 |
| 2,749,952 | 6/1956 | League | 144/208 E |
| 2,925,107 | 2/1960 | Fitzwater | 144/208 E |
| 3,282,310 | 11/1966 | Morenius et al. | 144/208 E |
| 3,308,861 | 3/1967 | Hamilton | 144/2 Z |
| 3,356,116 | 12/1967 | Brundell et al. | 144/2 Z |

FOREIGN PATENTS OR APPLICATIONS

| | | | |
|---|---|---|---|
| 31,052 | 6/1911 | Sweden | 144/208 E |
| 90,087 | 9/1957 | Norway | 144/208 E |
| 119,397 | 10/1958 | U.S.S.R. | 144/2 Z |

*Primary Examiner*—Gerald A. Dost
*Attorney*—Beveridge & De Grandi

[57] ABSTRACT

A rotary debarker-debrancher consists of apparatus having two coaxially positioned rings defining a path through the center thereof for a bole to travel for processing. The debarking-debranching tool arms have each of their ends pivotally mounted to a separate ring, both rings being rotated by power means in the same direction. The apparatus includes means for altering the circumferential position of one ring with respect to the other during rotation with the result being that the tools are pivoted inwardly or outwardly into or out of engagement with the circumferential surface of the tree. The tools are mounted on plates which overlap in an iris pattern to inhibit debris from entering the apparatus. Further, the tools are rotated in a direction to provide a lead cutting action to remove bark and branches from the bole and therefore throw it outwardly from the apparatus.

7 Claims, 13 Drawing Figures

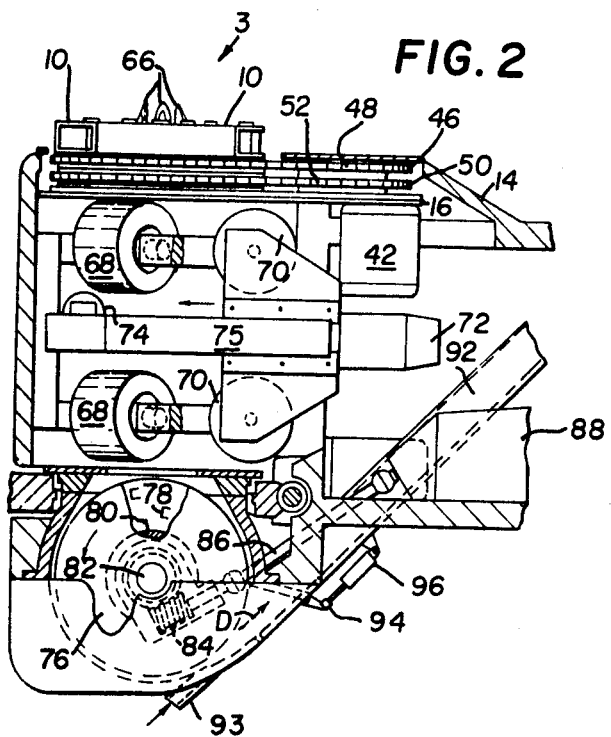
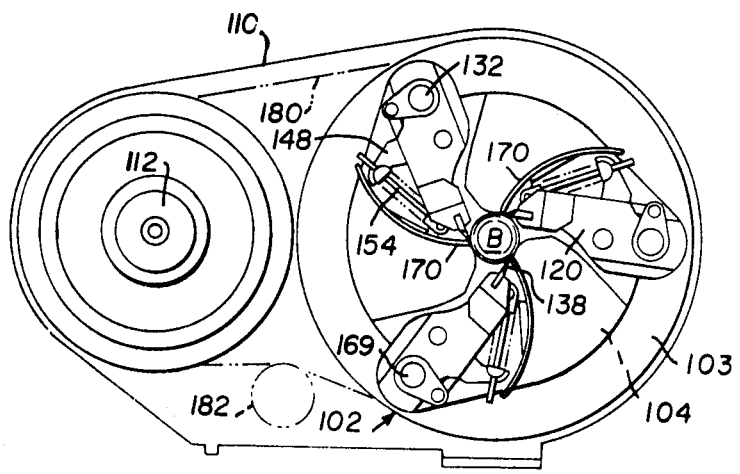

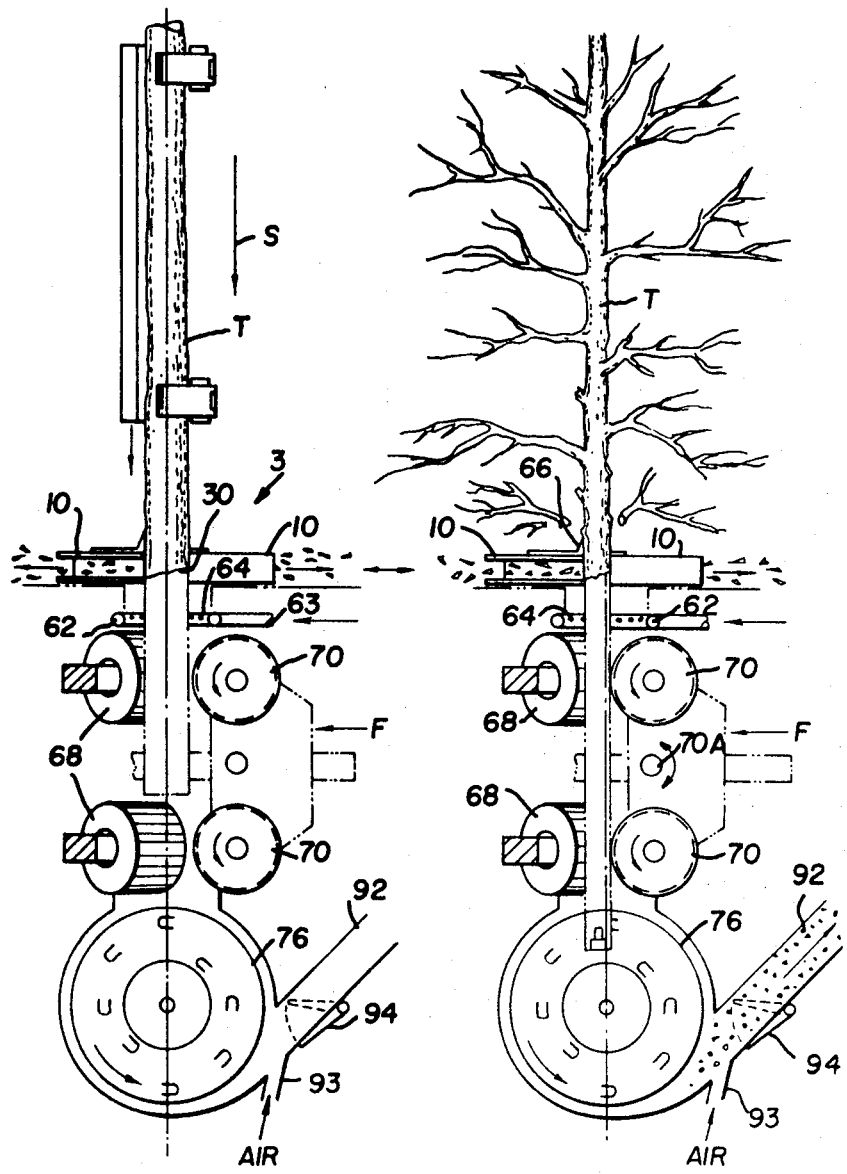

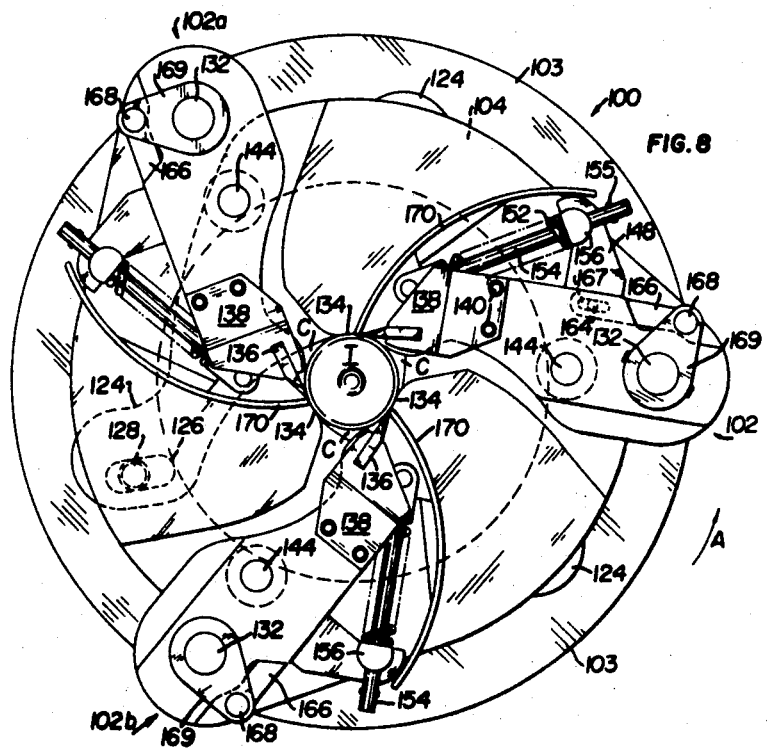

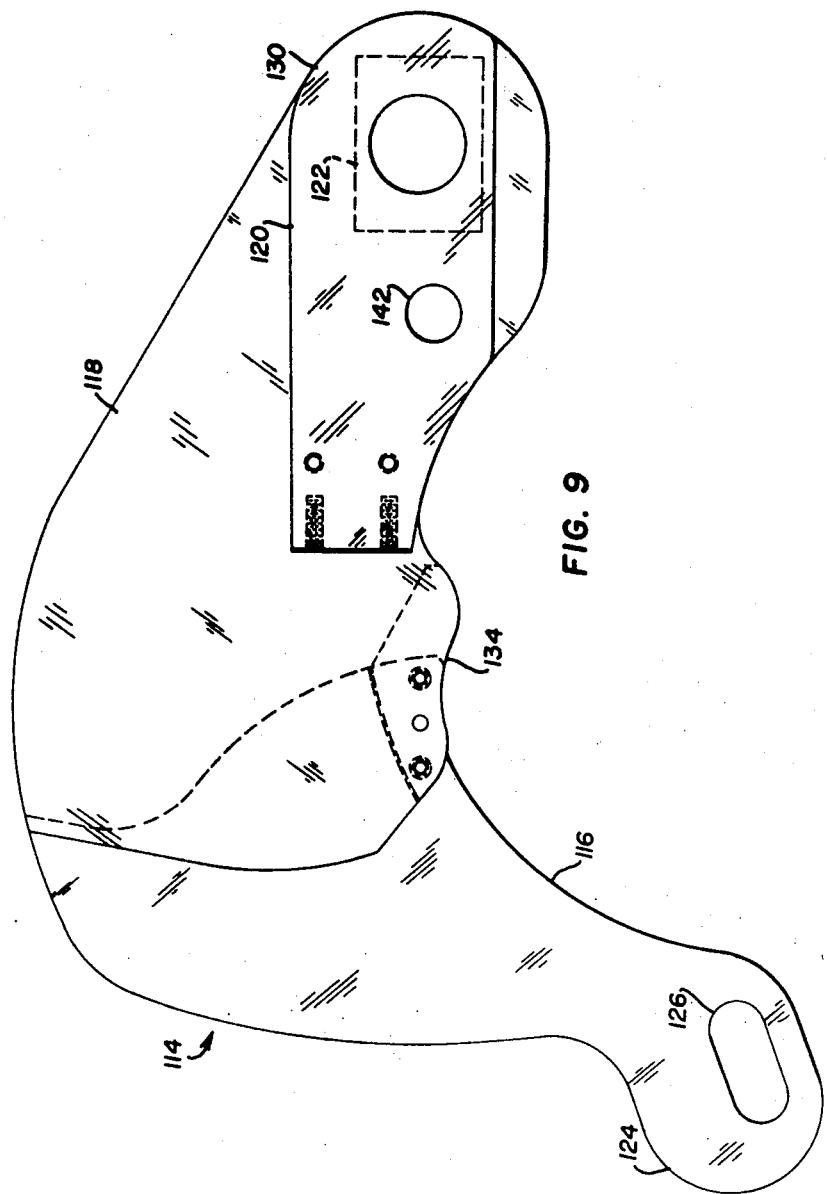

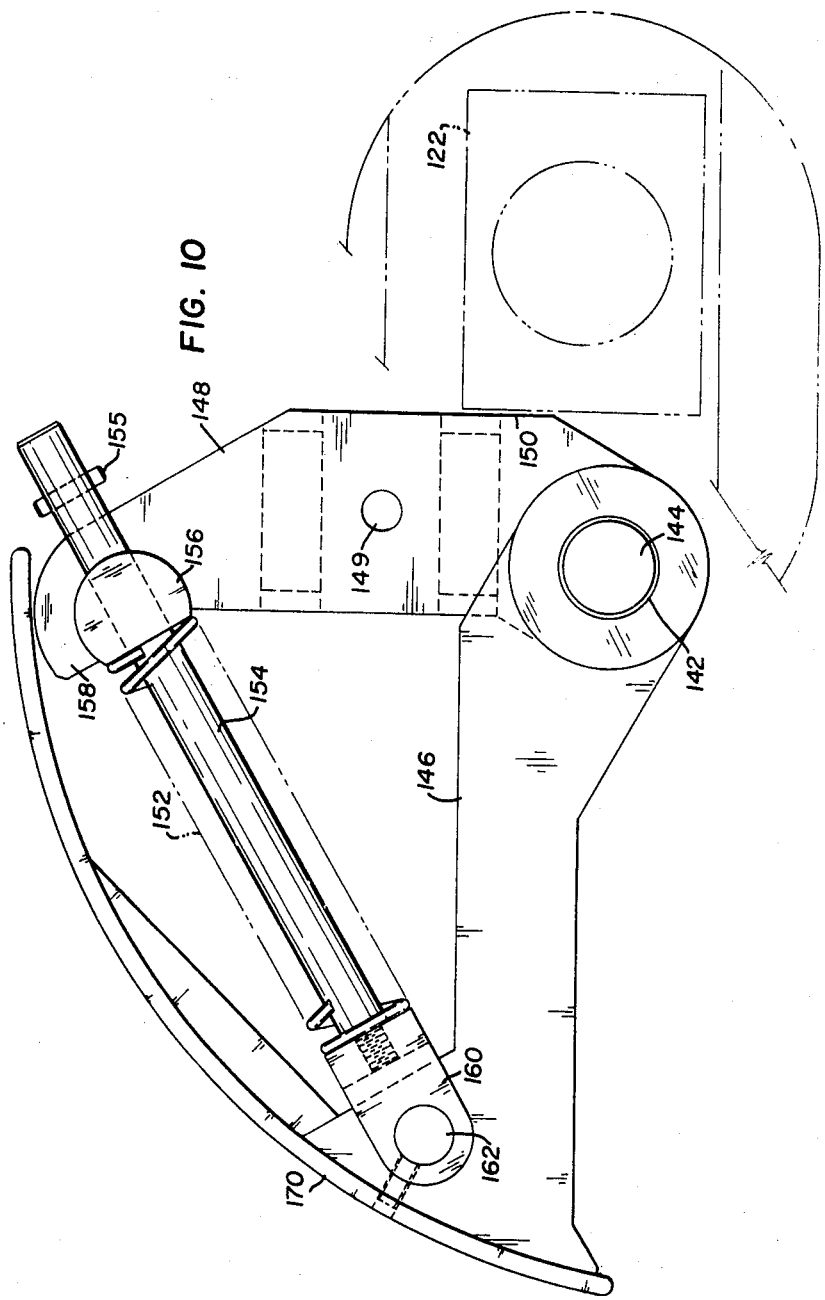

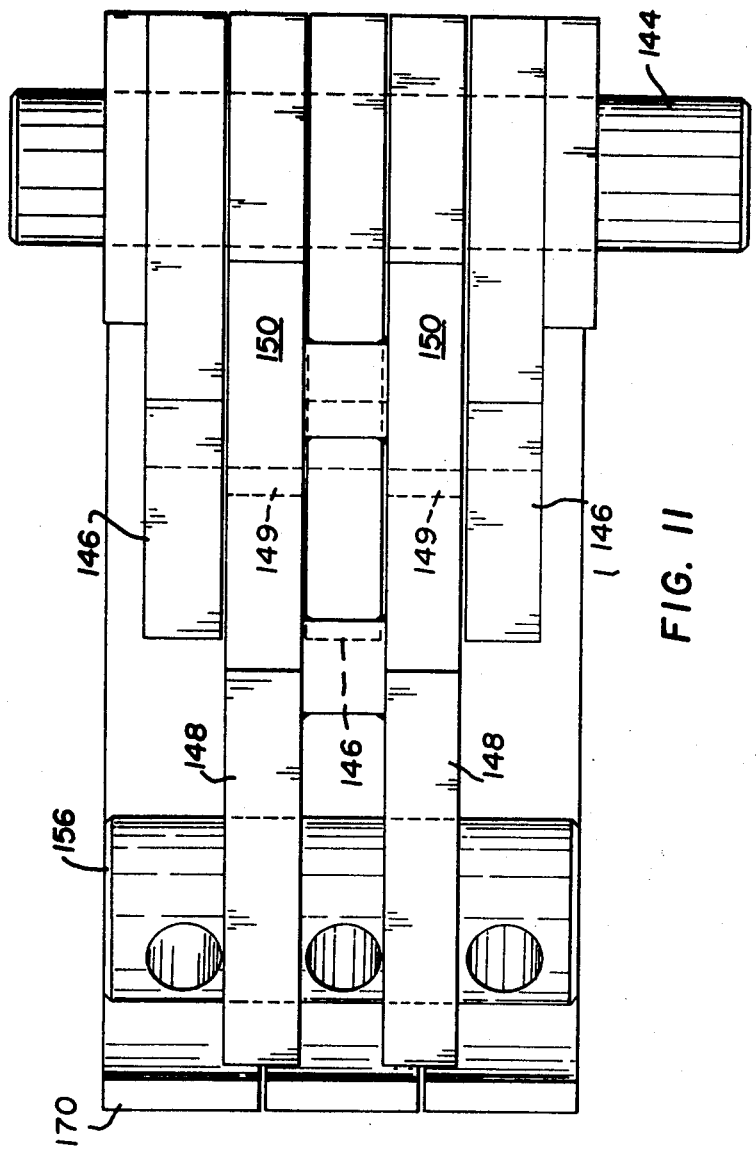

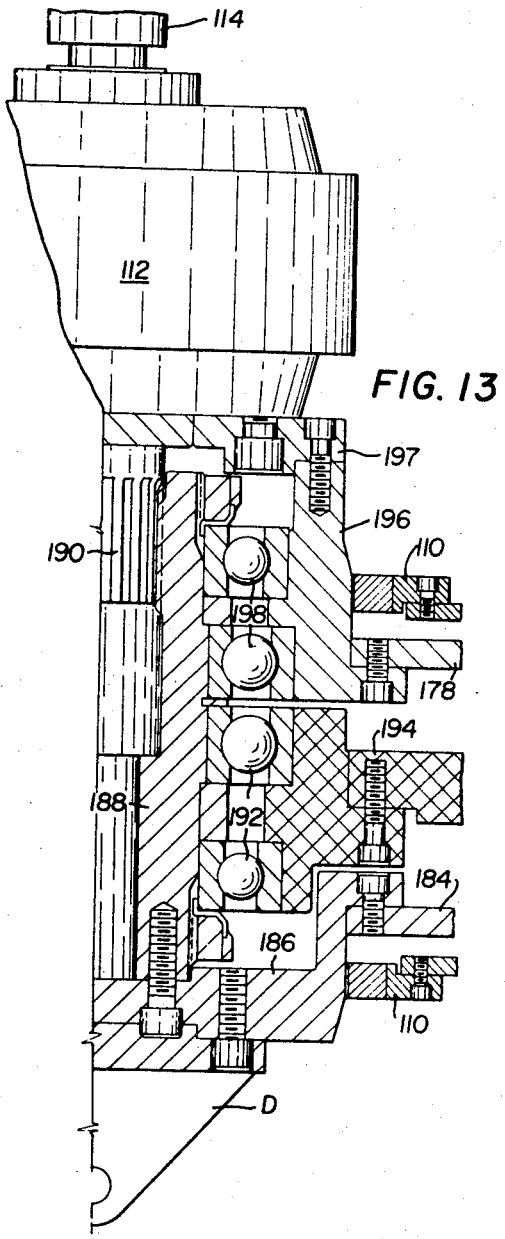

DEBARKING AND DEBRANCHING APPARATUS

This application is a Continuation-in-Part of my United States Patent application Ser. No. 572,530 filed Aug. 15, 1966, now U.S. Pat. No. 3,533,458 and which discloses a mobile tree processing factory for pulp mill raw material to which the present invention is ideally suited.

This invention relates to the tree processing aspect of forest harvesting and in particular to the processing operations of tree debranching, debarking or a combination thereof.

The term "bole" as used throughout this application defines the trunk of a tree which has been severed from its stump and in particular that portion of the tree extending from the butt end to its merchantable top diameter, excluding branches and bark.

There are numerous single purpose devices now being used for the operations of debarking and debranching trees either before or after removal from the stump. However, a considerable gap remains between this "state of the art" hardware and an optimum device which will effectively remove both bark and branches from a tree bole under a broad range of operating conditions and at the same time permit the integration of concurrent handling and subsequent operations such as chipping. The present invention is intended to provide a basic apparatus which will remove bark and branches from a tree so that its bole may be further processed into pulp mill raw material such as chips; and without the possibility of bark contamination that now exists. The removal of bark and branches is preferably, though not necessarily, effected with the bole in a generally vertical position.

The known means of effective mechanical debarking depends upon the cambium shear principle. A shortcoming of debarkers of this type is that debarking tool configurations are based on a "trail cutting" action to crush the cambium layer, fragment the bark and tear it away from the bole. However, this action causes the bark to be drawn into the area of tool operation on the bole surface causing a clogging of the tools and the retention of debris at the processing point. Conversely, the tools of the present invention provide for a "lead-cutting" action to improve the effectiveness of tool action at the bole surface; and to throw the bark outwardly or away from the bole.

Additionally the tool arm structure of the debarker disclosed in this application is arranged in an iris pattern for effective closure around the bole so that, when used in a prefered vertical orientation, bark is inhibited from dropping down into the apparatus.

The processing operation of debranching by mechanical means requires the application of appreciable power to cut, break, or otherwise remove branches at their juncture with the bole of a tree. These means range from:

a. drawing a tree of large mass, at relatively low speed and high force, through stationary, variable-opening devices having knife-like elements at their leading edge to;

b. moving a fixed or variable opening device of relatively low mass at higher speeds and lower force along the length of a stationary tree; or c. by applying high rotational speed cutting and/or impacting tools, such as cutters, hammers, chain flails etc., to the bole surface, then moving either the tools or the tree so that the circumference and length of the bole may be covered by the debranching means. Debranching of poor quality and/or unacceptable wood loss are well known product problems. High power consumption and an inability to effectively integrate associated handling with major processing operations have limited the efficiency of debranching as a part of the overall production operation.

The apparatus of this invention provides a debranching device which utilizes the energy of a rotating debrancher-debarker head to shear branches from the bole. Following initial start-up of the head, neither the mass of the tree nor the mass of the head need to be accelerated to effect the debranching operation, this operation being carried out in conjunction with debarking in such a way or to approach a constant power operating condition for processing.

The apparatus of this invention also provides a debranching-debarking device which exhibits a relatively short linear length in contact with the bole surface on which it will operate. The reduction of the linear length required for the processor increases the tool effectiveness on a curved bole while reducing the length and weight of the processor head. Additionally, the invention discloses simplicity in tool design to provide reliability and ease of replacement.

Additional features of this invention include a debranching-debarking device in which the tools maintain a constant circumferential operation on a bole of a tree fed into the apparatus; a mechanical feedback as the tool control means thereby rendering it responsive to variations in bole diameter and surface irregularities; and freedom to float the debranching-debarking tools in a plane normal to bole travel so as to accommodate variations in the axis of the tree bole.

The above-mentioned and other features will become apparent from the following description and the accompanying drawings in which:

FIG. 2 is a sectional view taken through a "primary arm" of the machine in FIG. 1 showing the disposition of one embodiment of a debranching-debarking means in that arm;

FIG. 3 is a diagrammatic view of the debranching-debarking mechanism shown in FIG. 2 and illustrating the relationship to the various tree processing mechanisms as the butt end of the bole is being introduced to the apparatus;

FIG. 4 is a view similar to FIG. 3 showing the relationship of the mechanism to the same bole but towards the end of the processing operation;

FIG. 7 is a front elevation of the device of FIG. 6;

FIG. 8 is an enlarged, more detailed frontal view of the mechanism and shows one operative position of the tool arms on a bole;

FIG. 9 is a plan view of the basic tool arm;

FIG. 10 is a plan view of a debarker blade as shown on the tool arm;

FIG. 11 is a partial side view of the blade arrangement of FIG. 10;

FIG. 13 is a sectional view taken along lines 13—13 of FIG. 6.

Figure 1:
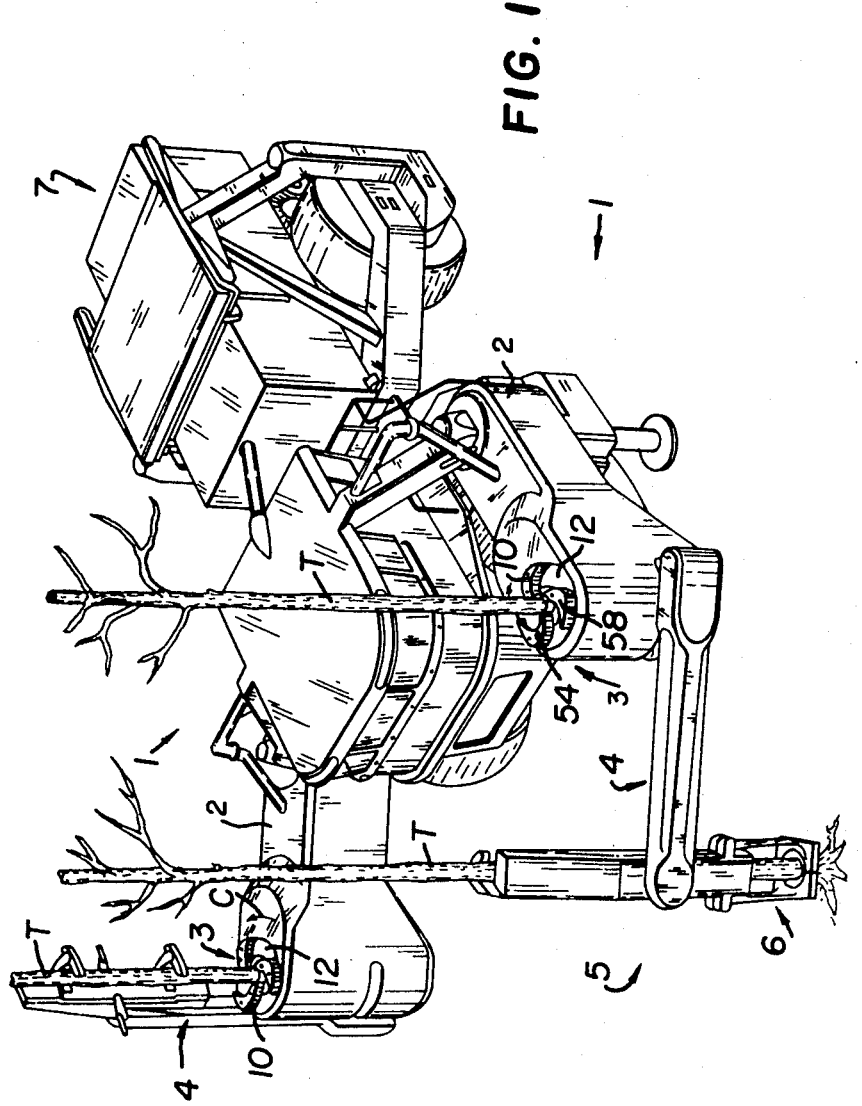
FIG. 1 is an overall perspective view of a tree processing machine as disclosed in my aforesaid copending application Ser. No. 572,530, the machine embodying the present invention.

The present invention is preferably applicable on a mobile platform such as a tree processing apparatus operable in the field. FIG. 1 is a view of one such processing machine, the subject of my corresponding application Ser. No. 572,530. It will be seen from FIG. 1 that this machine 1 includes a pair of primary arms 2 one pivotally secured to either side of the machine 1, each primary arm 2 carrying a debarker-debrancher mechanism 3 arranged in vertical orientation. A secondary arm 4 is movably secured to the primary arm 2 and secondary arm 4 carries a tree grasping, severing, and secondary feed mechanism generally indicated at 5. The latter includes impact shears 6 adapted to sever a tree from its stump whereupon the grasping mechanism 5 is positioned as of FIG. 1 shown on the right hand primary arm on the machine to feed the severed tree into the debarking-debranching mechanism 3 where the tree will be stripped of its bark and branches and, in accordance with the disclosure of application Ser. No. 572,530, reduced to chips by means of a chipping mechanism in the lower end of the primary arm 2 so that the chips will serve as a suitable raw material for a pulp manufacturing operation. As will be described later, the chips are subsequently transferred from the area of the primary arm 2 into the storage means 7 carried by the rear portion of the vehicle 1.

In accordance with the embodiment shown in FIGS. 1 through 5 inclusive, the debarking and debranching apparatus 3 embodies three debarking and debranching tools 10 which are carried by a rotating plate 12 which rotates the tools in a "lead cutting" action on the bark in the direction of arrow C in FIG. 1. In a full open position, tools 10 may be displaced so that their radially inner ends spread apart to allow the butt end of a tree to be introduced, the diameter of this maximum opening being approximately 18 inches for typical pulpwood operations. In the full closed position, tools 10 run upon the surface of a merchantable tree top diameter of approximately 4 inches. The action of the radially inner ends of the tools 10 upon the bark of a bole removes the bark which enters the hollow body of each tool 10 and is flung outwardly by centrifugal force to distribute the bark over the ground in the stump area. This action of the tools 10 is shown in FIGS. 3 and 4.

Figure 5:
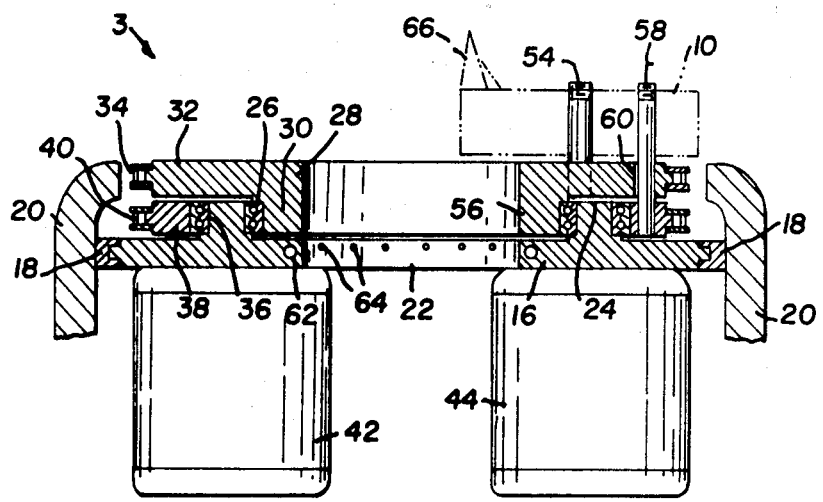
FIG. 5 is a sectional view taken along the lines 5—5 of FIG. 2.

Turning now to FIGS. 2 and 5, the debarking and debranching mechanism 3 is seen housed within a slight upward enlargement of the primary arm 2 which occurs with a sloping wall 14. The entire debarking-debranching mechanism is carried by a base plate 16 which is slidably mounted in ways carried by the structural members of primary arm 2 in a manner which will be more clearly recognized from a consideration of FIG. 5 which is a section view taken along along line 5—5 of FIG. 2. In FIG. 5 plate 16 is shown as being mounted for sliding movement at each edge in ways 18 carried by structural frame members 20 of primary arm 2. The base plate 16 is provided with a central aperture 22 about which and radially therefrom is an annular spigot 24. Mounted on spigot 24 by inner bearings 26 is a ring 28 having a first axial portion 30 and a second radial portion 32 extending radially outwardly and overlapping the spigot 24 and being formed with a peripheral chain sprocket configuration at 34. Mounted on outer bearing 36 is a second annular ring 38 which, as well, is formed with a peripheral chain sprocket configuration 40. Motors 42 and 44 are provided, mounted upon base plate 16 and movable or slidable therewith. Motor 42 is provided with a driving sprocket 46 on its shaft and about driving sprocket 46 is entrained a chain 48 which is also entrained about the sprocket configuration 34 of ring 28. Motor 44 carries sprocket 50 on its shaft driving through chain 52 to ring 38 by means of the sprocket confirguration 40 formed on its periphery.

The radial flange 32 of ring 28 carries vertically extending pins 54 at three equiangularly spaced points about the periphery of opening 22 in base plate 16 which is, of course, axially aligned with opening 56 in ring 28 and which, together, define the opening through which the bole will enter the apparatus and pass therethrough. Ring 38 is also provided with pins, these bearing reference numeral 58 and which pass through arcuate slots 60 formed in the radial flange 32 of ring 28. The upper ends of pins 54 and 58 can be seen in FIG. 1 mounting the debarking and debranching tools 10, one of which is also shown in dotted lines in FIG. 5.

It will be apparent that since pins 58 pass through slots 60 in ring 28, it is necessary that motors 42 and 44, for the most part, run in synchronism and that ring 28 is rotated at exactly the same speed as ring 38. In this way, the tools 10 will be caused to orbit the axis of apertures 22 and 56 with their inner ends defining a circle concentric with that axis. If ring 28 were, as seen in FIG. 1, to be advanced slightly ahead of ring 38, then pin 54 would be displaced angularly relative to pin 58 with the result that the relative position of tool 10 would change, the inner end of the tool moving radially outwardly in order to define a larger circle about the axis of openings 22 and 56. Conversely, if ring 38 were to be advanced relative to ring 28 or, in other words, rotated slightly faster for a very brief moment, then pin 58 would "catch up with" pin 54 thereby changing the angular position of tool 10 so as to move its free end radially inwardly to define a smaller circle in its orbit about the common axis of openings 22 and 56. Accordingly, the opening and closing of tools 10 so as to, in the first place, provide a wide open entry port for the initial entry of the butt end of a bole and to subsequently close down upon the bole to remove its bark and to follow the changing diameter of that tree as it is fed into the machine from its largest diameter adjacent its butt to its smallest diameter adjacent its top can be achieved by simply selectively controlling the relative speed of rotation of motors 42 and 44 over a narrow range and over a very brief time interval so as to provide a very precise, accurate and immediately responsive control of the debarking tools 10. Numerous advantages flow from this construction, not the least of which is that the entire rotating mass can be dynamically balanced and utilized to stabilize the debarking-debranching power requirement.

Formed within the base member 16 and surrounding the central opening 22 is an annular air gallery 62 from which there extends upwardly sloping air jets 64 adapted to direct an upwardly flowing air blast through the aligned openings 22 and 56 for the purpose of blasting upwardly any loose bark or other debris which forms during the debarking operation. As was described above, the majority of the bark will enter the hollow tools 10 and be discharged centrifugally in a radial direction. The provision of plate 12 also blocks off a large portion of the area adjacent the bole to prevent bark from entering the interior of arm 2. However, a certain amount of bark would fall downwardly through openings 56 and 22 into the interior of the primary arm 2 and would, in time accumulate to an objectionable extent. Accordingly, in addition to plate 12 the air blast is provided in order to reduce, as much as possible, the entry of bark and debris within the primary arm 2. The air gallery 62 will be supplied in a known manner (not shown) with compressed air from air lead 63 which is illustrated in FIG. 3.

In addition to performing the debarking function, the radially inner ends of the tools 10 are provided with upwardly extending knives 66 which orbit about the same axis as do the debarking portions of the tools. The knives 66 are provided with cutting edges directed in the direction of rotation and the knives will serve to sever from the tree trunk any projecting branches and, to some extent, to smooth down bumps, knobs and other sharp projections which might interfere with later handling of the bole within the processing apparatus. Reference will be had later to FIG. 4 in greater detail but in this figure the function of the debranching knives can be very readily seen.

Immediately below the debarking-debranching apparatus is a primary feed and guide apparatus essentially comprising guide idler rollers 68, powdered feed rollers 70, feed roller driving motor 72, adjusting motor 74 and supporting framework securely fixed within the structural components of the primary arm 2.

The guide and feed apparatus has been illustrated more fully in my copending application Ser. No. 572,530. It is sufficient for this application to consider FIGS. 2, 3 and 4 which show that a second or lower pair of guide rollers 68 are vertically aligned with the upper set of rollers 68 and arranged with their axis forming an angle of 90° to one another.

LOcated between the upper set and the lower set of rollers 68 is a rearwardly extending yoke comprising a transverse forward member and a pair of rearwardly extending arms 75 which constitute ways within which may slide mounting flanges of the support mechanism carrying the powered feed rollers 70. Rollers 70 are driven by motor 72 running through a gear reduction box, driving sprockets and drive chains, not shown, as described in application Ser. No. 572,530.

The position of feed roller 70 relative to the 90° V formed by idler rollers 68 is determined by the operation of motor 74 which is housed within a member of the rearwardly extending yoke. As described in application Ser. No. 572,530 the motor 74 is of the double-shaft type driving into a bevel gear box to rotate lead screws engaged with captive nuts so that operating the motor 74 in one direction will advance the carriage carrying powered feed rollers 70 towards the idler rollers 68 so as to engage a bole positioned therebetween and reverse operation of the motor will withdraw the carriage from such engagement.

It will be noted that a bole engaging or entering the guide and feed apparatus disclosed in FIGS. 2, 3 or 4 will be engaged about two radial planes spaced along its length, and at each of these points, will be contacted at three planes spaced about its circumference. This provides for an extremely stable support and guide for the bole and also provides for simple and positive engagement with the bole by the powered feed rollers 70 which rotate to feed the bole downwardly with respect to FIG. 2.

As disclosed in detail in application Ser. No. 572,530 the secondary arm 4 (FIG. 1) initially feeds the butt end of a bole into the debranching and debarking mechanism 3 which at that moment is in a wide open position. Then control of the speed of motors 42 and 44 will cause the debranching and debarking tools 10 to close down upon the bole surface, engage it, remove the bark, and, if any, the branches thereon. Continued downward movement will cause the butt of the bole, having passed through the debarking and debranching mechanism and having had its bark removed, to begin to enter the guide and feed mechanism illustrated in FIGS. 3 and 4.

Motor 74 will advance the carriage containing the powered drive rollers 70 until these rollers are firmly in engagement with the surface of the bole and the support for the bole and the feed downwardly thereof will be assumed by the guide and feed mechanism illustrated in FIGS. 3 and 4.

As shown in FIGS. 2, 3 and 4, primary arm 2 includes a chipping wheel 76 for further processing the debarked and debranched bole. The chipper 76 is a dual truncated cone type chipper having a deep V-shaped groove in its radial periphery, the sides of this groove being provided with chipping teeth or blades which are schematically illustrated at 78 in FIG. 2. The chipping wheel 76 is driven through a gear 80 keyed to its mounting shaft 82, the gear 80 being engaged by worm 84 driven by drive shaft 86 which, in turn, is driven through a gear box and motor 88 as shown.

As the bole is driven downwardly against the chipping surfaces of chipping wheel 76, the bole will be reduced to chips which, initially by centrifugal force, will be flung in the direction of arrow D into duct or conduit 92. Additional kinetic energy will be imparted to the chips at approximately point 93 by air jets supplied with pressurized air from air line 63 to cause the chips to pass upwardly and rearwardly and rearwardly along duct 92 to eventually be blown into the storage means 7, FIG. 1.

Referring to FIG. 1, a typical southern softwood tree can be seen as comprising a branch crown and a relatively straight bole. As the bole is fed downwardly into the chipping wheel 76 by means of the feed rollers 70 acting against idler rollers 68, the bole diameter will continually reduce and feed rollers 70 will continually be advanced towards idler rollers 68 by the operation of motor 74. At the same time, debarking and debranching tools 10, under the control of motors 42 and 44 will be following the reducing diameter of the bole so as to continuously perform their operation upon it.

In this embodiment both the debarking and debranching mechanism 3 and the guide and feed roller mechanism generally shown in FIGS. 3 and 4 are able to close down so as to bear against and act upon a bole having a minimum diameter of approximately 4 inches. The characteristic of the kind of tree encountered in southern pulpwood operations is such that the tree bole has, as a general rule, more or less disappeared and become indistinguishable from the laterally extending branches by the time the tree trunk diameter has been reduced to something of the order of the 4 inch minimum size. The debranching knives 66 will, as the bole diameter reduces, ultimately orbit about a 4 inch diameter circle and will server all of these branches and, at some point, when the bole has ceased to exist as such, the debranching knives 66 will finally sever all of the remaining tree so that the debarking knives then orbiting in a 4 inch circle will no longer contain any material within that circle and, in this way, the top of the bole is simply disposed of by allowing the severed branches to be discharged radially outwardly of the debarking and debranching mechanism to fall upon the ground below the primary arm 2.

In those instances where there is a bole extending in a more or less straight line so as to lie within the minimum circle orbited by the debranching knives 66, this small bole portion will, under the pulling influence of the chipper, simply be drawn into the chipping wheel 76 at a very rapid rate since its feed will no longer be under the control of the feed rollers 70, which, as stated above, cannot act upon trees of much less than 4 inches in diameter.

In this event, if a bole of less than 4 inches in diameter is passed to the chipping wheel, the chipping wheel would then produce chips of a quality unsuitable for pulp production since the bark will not have been removed due to the fact that the debarking apparatus will not act upon trees of that diameter.

To overcome this problem the duct 92 is provided with a valve 94 which, under "normal" conditions occupies the solid line position shown in FIGS. 3 and 4. When, however, the debarking and debranching tools 10 have closed down to their minimum extent and are, therefore, incapable of removing bark from boles of smaller diameter, actuator 96 (FIG. 2) will be energized so as to move the valve 94 from its solid line position to its dotted line position as shown, thereby opening a port in duct 92 so as to allow those chips including bark from small diameter tree portions to be ejected onto the ground, thereby avoiding contamination of the chips which are delivered to the duct 92 and, thence to the chip storage means 7.

Having described in some detail the apparatus associated with primary arm 2, it might be convenient now to refer to FIGS. 3 and 4 in which the various functions which have so far been described are illustrated in a more or less schematic form. FIG. 3 illustrates the introduction of the butt end of a bole T into the apparatus and shows the initial debarking of the butt and the radial discharge of the bark through the hollow debarking tools. In the position shown in FIG. 3, the bole is still under the control of, and being fed by the secondary feed system of arm 4 although, as can be seen, the carriage containing the powered feed rollers is being advanced in the direction of the arrow F in order to engage the surface of the bole when the butt thereof has passed the axis of rotation of the lower idler rollers 68. The chipping wheel 76 is continuously rotating and is ready to begin the chipping operation on the butt of the bole as soon as it is engaged thereby.

FIG. 4 shows the same bole at a later point in the processing cycle. The secondary feed system of arm 4 has been released from the bole and operating on its tree gathering cycle. Feed rollers 70 are now engaged with the surface of the bole, controlling its position and driving it downwardly into the chipping wheel 76 which is discharging chips along duct 92 with the assistance of an air jet entering through port 93. Feed rollers 70 control the feed rate of the bole to the chipper 76 to maintain the desired chip quality. The debarking tools 10 are still removing bark from the bole and, at the same time, the debranching knives 66 have now encountered branches towards the top of the bole and are removing them before that portion of tree enters the debarking mechanism.

It should also be noted that rollers 70, as can best be seen in schematic drawing FIG. 4 are mounted for a "rocking" motion about an axis indicated at 70A in FIG. 4. In this way, the feed rollers 70 can accommodate such localized disturbances as may be encountered upon boles being fed through the apparatus.

The second embodiment of this invention is illustrated in FIGS. 6 through 13 inclusive and referring firstly to FIG. 8, the debranching and debarking apparatus is illustrated generally at 100 and utilizes three debranching and debarking tools 102 which are supported by rotatable outer and inner rings 103 and 104 respectively. The rotation of the apparatus is effected counter clockwise in the FIG. 8 view whereby the tools 102 orbit a circumferential path about the center of the apparatus 100 which, in FIG. 8, is occupied by a bole T.

Figure 6:
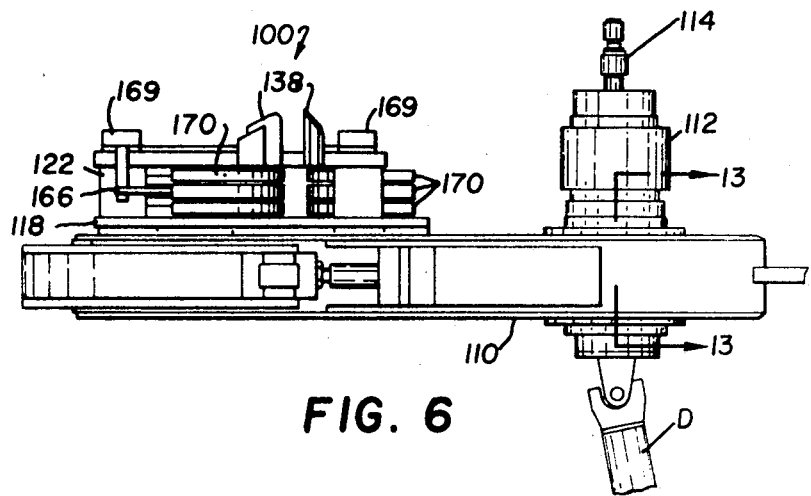
FIG. 6 is a side elevation view of a second embodiment of the debrancher-debarker and its associated rotating mechanisms.

In a preferred embodiment of the invention as shown in the fully assembled drawings of FIGS. 6 and 7, the outer and inner rings 103 and 104 (FIG. 8) are supported for rotation in a casing 110 and are rotated by suitable drive means, not shown, through a rotary actuator 112 which provides and governs relative rotational positional changes between the rings 103 and 104 in a manner and for a purpose to be subsequently described. Rings 103 and 104 correspond to rings 28 and 30 of FIG. 5 and the actuator 112 of the present embodiment fulfils the function of the speed differential effected to the rings 28 and 30 in FIG. 5 by their motors 42 and 44, that is, the circumferential position of one ring is altered with respect to the other. Additionally, the apparatus 100 is also provided with sufficient float freedom as is the first embodiment, normal from the longitudinal axis of the bole T to compensate for crooks and other axial irregularities normally encountered in the bole of a tree.

Figure 12:
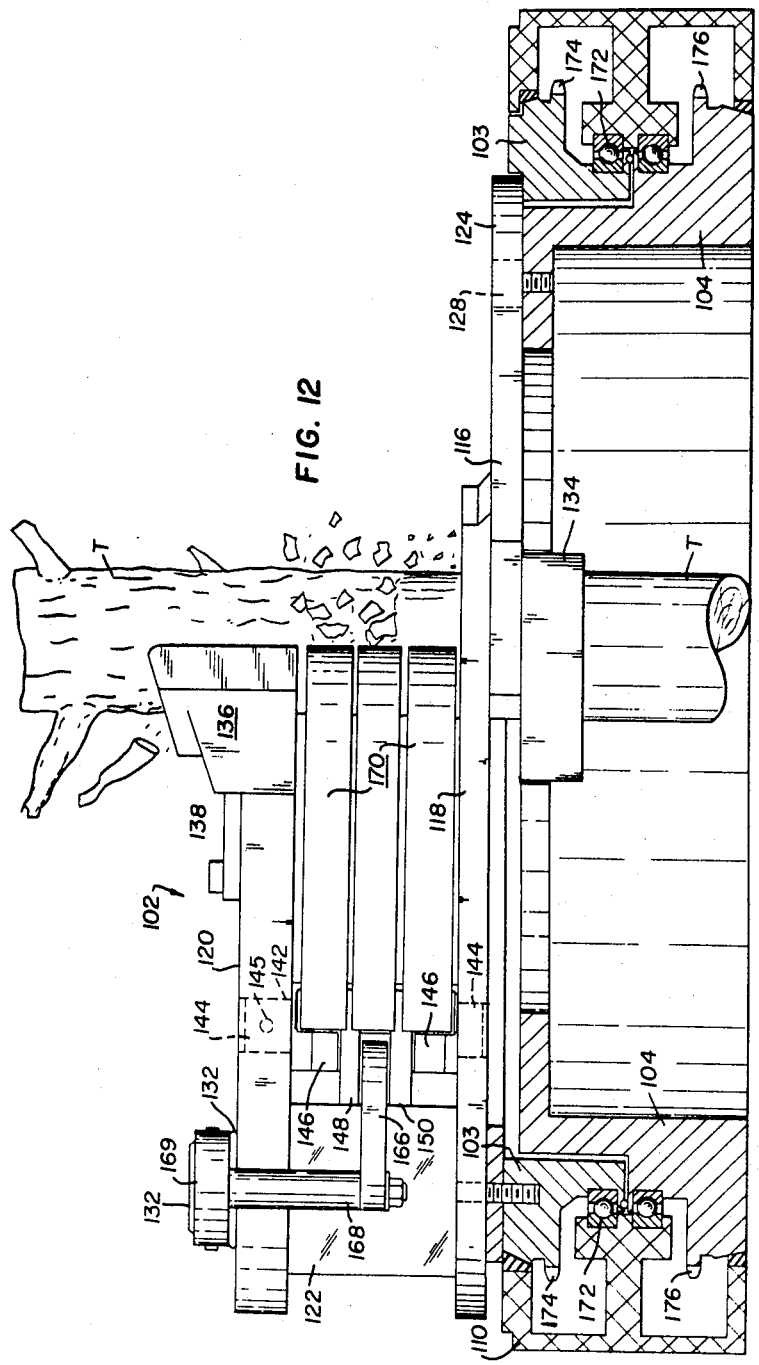
FIG. 12 is an elevation view partly in section of one tool arm and its associated mechanism, showing positions thereof during a debranching and debarking operation.

FIGS. 9 through 12 illustrate the debarking-debranching tool 102 in detail, FIG. 8 providing a frontal view of the assembled apparatus 100 exclusive of the casing 110 and the actuator 112, with FIG. 12 showing in side-elevation one tool 102 in an operative position. Referring to FIGS. 9 and 12, each tool 102 comprises a tool support arm 114 with two stepped lower plates, 116, 118 and an upper plate 120 secured to and spaced from plate 118 by a rectangular pivot block 122. Plate 116 provides a leading end 124 to the complete tool 102 by means of an elongated slot 126 pivotally securing that end to the inner rotatable ring 104 by a pivot pin 128 (FIG. 8). The other or trailing end 130 of the tool 102 is pivotally mounted to the outer rotatable ring 103 of the apparatus by a swivel pin 132 passing through block 122 as shown in FIGS. 8 and 12.

Plate 118, adjacent its connection with plate 116, includes a guide shoe 134 adapted to ride on the surface of the bole just below the debarking members. Upper plate 120 carries a debranching knife 136 by way of a holder 138 secured to a terminal end of the plate 120 via studs 140, see FIG. 8. In this manner, debranching knives 136 are readily replaceable.

The plates 118 and 120 of the support arm 114 are align bored at 142, (FIGS. 9 and 12), to receive a pin 144 (FIGS. 8 and 11) on which the tool assembly is mounted. Pin 144 is anchored in plate 120 by pin 145. As shown in FIGS. 10 and 11, pin 144 pivotally supports a plurality of fingers 146 each of which is separated from an adjacent finger by a knuckle spacer 148. It will be noted from FIG. 10 that knuckle spacer 148 has a planar side portion 150 abutting against a like surface of the pivot block 122.

The fingers 146 and knuckle 148 may move relative to one another but are maintained generally in the FIG. 10 position by springs 152 coiled about connecting rods 154. A rotatable pin 156 having a flattened spring seat passes through the outer terminal ends 158 of knuckle 148 and pin 156 slidably receives one end of each connecting rod 154 as illustrated. A stop pin 155 in the terminal end of the rods 154, prevents the rod from being pulled through pin 156 under the pressure of the spring 152. The other ends of rods 154 are each pivotally mounted to the free ends of the fingers 146 by yokes 160 and pins 162.

Spacer knuckle 148 is drilled at 149 (FIG. 10) to receive a pin 164 mounting one end of a link 166 (FIGS. 8 and 12) which, together with vertical rod 168, secure the knuckle 148 to an arm 169 mounted fast on the upper end of the pivot 132 which mounts the tool assembly and is, itself, mounted on ring 103 of the main assembly. However, knuckle 148 and the associate structure of fingers 146 are limited in relative movement by the lever arm 166 which is slotted as shown by the broken lines 167 in FIG. 8, at its connection to the pin 164.

Lastly, each finger 146 carries, at its outer end thereof, an arcuate shaped debarking blade 170. The number of fingers 146 and blades 170 to be used is dependent on the type of tree being processed, the feed rate of the bole passing through the apparatus and other factors. However, for the purpose of this application three fingers and blades are shown as in FIG. 12.

There are several observations to be made at this point with respect to the assembly drawing of FIG. 8. First, the tool support assemblies 102, 102a and 102b have a base structure of stepped plates 116 and 118 (FIGS. 9 and 12) that provides circumferential overlay of plates 116 of tool 102 by plate 118 of adjacent tool 102a for all positions of 102 and 102a from full open to full close. Similarly, plate 116 of 102a is overlayed by plate 118 of 102b and plate 116 of 102b by plate 118 of 102 thereby to form an iris that substantially closes the whole surface of the apparatus 100. When the apparatus is used in a vertical environment such as the processing machine of FIG. 1, this iris construction inhibits bark from dropping down into the lower end of primary arm 2. The only areas not closed are those small areas indicated at C in FIG. 8. Such areas may be maintained free of debris by the provision of upwardly directed air jets of the type shown in FIG. 5.

Secondly, the debranching knives 136 and the debarking tools 170 rotate or orbit counter clockwise about the bole T to provide a lead cutting action as opposed to the trail cutting action of prior art devices to remove limbs and bark from the bole of a tree. The lead cutting action and tool shape accelerates loose material outwardly from the tools 102 and apparatus 100 thereby removing branches and bark from the area of openings C to further inhibit the entrance of debris into the confines of the apparatus. Thirdly, guide shoes 134 control the position of the delimbing knives 136 on the bole surface and provide a basic mechanical feedback control for those knives and for the debarking tool assembly. It will be observed from FIGS. 8 and 9 that the guide shoes 134 each have an arcuate shape which conforms them collectively to a large circumferential surface of the bole as shown in FIG. 8. This large circumferential area in contact with the freshly debarked surface of the bole minimizes crushing; is self lubricating; and provides a highly responsive delimbing tool control means.

Fourth, it will be observed from FIGS. 8, 10 and 12 that the operating tips of debarking blades 170 are maintained in constant contact with the surface of the bole under pressure of springs 152 acting to press the blade 170 and fingers 146 away from the knuckles 148. The provision of the coiled spring 152 on the rod 154 which is slidably positioned in the pin 156, ensures that the debarking blades 170 float on the surface of the bole to remove the bark therefrom. The amount of float is limited by the movement of the pin 164 in the slot 167 of the arm 166 as shown in FIGS. 9 and 11, such limitation being required to restrain the inward movement of debarking tools 170 when a bole is not present in the apparatus.

In the earlier described embodiment, the debarking and debranching rings 28 and 38 were rotated by motors 42 and 44 as shown in FIG. 5. By changing the relative rotational speed of one motor with respect to another over a narrow range and for a very brief time interval, the debarking tools 10 which were attached to those rings could be accurately adjusted so as to act on a bole being fed through the apparatus 1. Each tool was pivoted about two pivot points i.e., the pins 54 and 58 projecting upwardly from the rings 28 and 38. By altering the circumferential position of the rings with respect to one another, the tools 10 pivoted on those pins were caused to move their cutting ends closer or farther away from the center of the apparatus 1.

A fifth observation therefore with respect to the present embodiment relates to the mounting of the tools 102 on the outer and inner rings 103 and 104 and the differences and improvements of the present mounting over the earlier embodiment. It will be noted from FIG. 8 that each tool 102 extends almost completely across the apparatus 100 in a diametrically opposed arcuate path and the spacings of the pivot points are almost twice as great as those in the earlier embodiment. Thus, one end of tool 102 is pivoted about pin 132 while its other forward end 124 is pivoted about the pin 128 which extends upwardly from the ring 104 through the slot 126. It will be appreciated that outer and inner rings 103 and 104 rotate in a counter clockwise direction indicated by the arrow A in FIG. 8 and that the rings generally run synchronously. However, in order to bring the knives 136 and debarking blades 170 into contact with the bole surface, it is necessary to alter the circumferential position of the inner ring with respect to the outer ring or vice versa. Assuming then that the outer and inner rings 103 and 104 are rotating, relative rotation of inner ring 104 will pivot the leading end 124 of tool 102 about pivot 132 at the other end and thereby draw guide shoe 134, blades 170 and knife 136 toward the bole center. The tools are therefore "closed" by rotating the inner ring 104 in one direction, relative to ring 103, and are "open" by rotation of ring 104 in the other direction relative to ring 103. As with the earlier embodiment, a very precise, accurate and responsive control of guide shoe 134 and the associated tools is afforded by the rotary positioning of the rings 103 and 104 but in the present embodiment the control and accuracy is greater than in the earlier inasmuch as the wider spacing of the pivot points in the tool allows a finer degree of adjustment.

While the rings 28 and 38 of the first embodiment were driven separately by their own motors, it should be noted that various forms of differential means can be used to alter the rotational positioning of one ring with respect to another. In the present embodiment, the means to alter the rotational position of ring 104 with respect to outer ring 103 is disclosed in FIGS. 6, 12 and 13.

As partially shown in FIG. 12 rings 103 and 104 are mounted for rotation in casing 110 by suitable bearings 172. Ring 103 has a circumferential sprocket 174 secured thereto and inner ring 104 has a similar sprocket 176. Sprocket 174 on ring 103 is rotated by drive means D which transmits rotary motion from any suitable power source through a drive sprocket 184, FIG. 13, and roller chain 180, FIG. 7, and which is also trained about a chain tensioner 182.

As shown in FIG. 13, drive means D also rotates sprocket 176 on ring 104 by a second drive sprocket 178 but through a rotary actuator 112. In the illustrated example this actuator comprises a rotary vane type which provides appropriate rotation to ring 104 with respect to ring 103 effecting the opening and closing of the debranching and debarking tools 102. The chain interconnecting sprockets 176 and 184 are also trained about tensioner 182.

Referring again to FIG. 13, drive sprocket 184 is directly connected to a coupling member 186 which in turn is secured suitably to the drive means D. A tubular coupling 188 interconnects the drive D with a spline shaft 190 of the actuator 112 while bearings 192 support the coupling 188 in the structural wall 194 of the casing 110. Drive sprocket 178 is directly connected to coupling member 196, sub-plate 197 and actuator 112, the assembly being supported by bearings 198 on tubular coupling 188. The relative position of driving sprockets 178 and 184 is, therefore, determined by the vane position of rotary actuator 112 yet the entire drive assembly can rotate freely in casing 110, the rotary actuator 112 hydraulic connection being made by means of swivel joints 114 to the power source.

Appropriate hydraulic control of the rotary actuator 112 governs the opening and closing of the tools 102 and the pressure of the guide shoes 134 on the bole T as its diameter varies during processing through the apparatus 100.

When installed in a processing machine as shown in FIG. 1, the operational sequence would be as follows:

1. The apparatus 100, FIG. 6, is in rotary motion with tools 102, 102a and 102b orbiting in full open position.

2. A tree bole is fed butt end first into the apparatus to the depth of debarking blades 170 by the secondary feed system of arm 4 which aligns the tree with the longitudinal axis extending through the apparatus 100, the feed system of arm 4 grasping the bole securely to prevent rotation by the action of the tools 102.

3. The rotary actuator 112 is operated to advance ring 103 with respect to ring 104 and thereby close the tools 102 onto the bole so that the debarking blades 170 begin to remove the bark from the bole surface, throwing it outwardly due to the counter clockwise rotation.

4. The secondary feed system of arm 4 then feeds the bole into the apparatus 100 until the primary feed rolls (FIGS. 3 and 4) grasp the bole and feed it through the apparatus, freeing the secondary feed.

5. The bole is drawn completely through the apparatus 100 until the tools 102 orbit to the limit of their closure.

6. The rotary actuator 112 which up to this time has maintained constant pressure at the interface between guide shoe 134 of tools 102 and the debarked surface of the bole, is operated to open the tools 102 to receive the next tree from the secondary feed system of arm 4 to repeat the sequence.

Although this disclosure refers to a specific type of delimbing knife and debarking blade, it is well within the scope of the invention to utilize other types of debranching members on the tools 102 such as fly-cutters with an appropriate mechanical drive as known in the prior art, or to use only debarking members of conventional design when the tree boles being processed have previously been debranched, e.g., by manual tools.

Additionally, this specification has referred to the apparatus operating in a vertical orientation but it may also be used in static or mobile form in a substantially horizontal arrangement. The debranching-debarking apparatus should not be considered applicable only to the processing machine shown in FIG. 1, which is illustrated by way of example.

I claim:

1. A rotary debarker comprising
   a. a support casing;
   b. inner and outer rings coaxially mounted for rotation in said casing and defining a central opening therein to provide a path of travel for a tree bole to be processed by said debarker;
   c. power means for rotating the inner and outer rings in the same direction;

d. a plurality of pivot pins secured to the surface of the outer ring and spaced evenly about said surface;

e. a plurality of guide pins secured to and spaced equally on the surface of the inner ring;

f. a plurality of tool holders secured to said rings for rotation therewith, each holder substantially spanning said rings in an arcuate form and having a first end pivotally secured to a pivot pin on the outer ring and a second end picotally secured to a guide pin on the inner ring; each said tool holder including a lower plate extending between and connected to said guide and pivot pins and an upper plate secured at one end to the pivot pin on the outer ring, a portion of the lower plate being connected pivotally to the inner ring guide pin and being stepped to extend beneath the lower plate of an adjacent holder; a spacer pin adjacent the pivot pin and interconnecting the upper and lower plates of the holder; and debarking tools resiliently mounted on the spacer pin and positioned to engage the surface of a severed tree in the path of travel;

g. debarking tools on the first end of each holder extending inwardly towards said path of travel to engage and process a tree passing therethrough;

h. and a rotary actuator for altering the circumferential position of one ring with respect to the other during rotation thereof whereby said guide pins on the inner ring will advance or recede the second ends of said holders and the tools thereon into or out of engagement with the surface of said tree.

2. A debarker according to claim 1 including a delimbing knife on the other end of each upper plate, spaced above said debarking tools.

3. A debarker according to claim 1 including a guide surface on the lower plate of each tool holder adapted to ride the surface of said severed tree.

4. A debarker according to claim 1 wherein said debarker tools of each holder comprises finger and knuckle members pivotally attached to the spacer pin; a connecting rod secured at one end to each finger and slidably engaging a knuckle member;

a debarking blade secured to each finger and having one end adapted to engage the surface of said tree; and spring means on said connecting rod urging the finger and blade away from the knuckle whereby the end of the blade will resiliently float upon the tree surface.

5. A debrancher according to claim 2 wherein the power means comprises driven sprockets on the inner and outer rings, a motor and drive sprockets interconnected to the driven sprockets by roller chains, and a rotary actuator intermediate the motor and one of the drive sprockets for altering its circumferential position with respect to that of the other drive sprocket whereby one of said rings will advance or retreat circumferentially with respect to the other ring.

6. A rotary debarker comprising a pair of coaxially mounted rings defining a central opening therein to provide a path of travel for a tree bole to be debarked; means for rotating said rings in the same direction; a plurality of debarking tool holders each extending across the path of travel in an arcuate line and being pivotally mounted at one end to one of the rings and at the other end to the other rings; portions of said holders overlapping one another in an iris arrangement so that altering the circumferential position of one ring with respect to the other will open or close the iris arrangement of the holders and decrease or enlarge, respectively, the path of travel of the tree bole; and debarking tools mounted on each tool holder.

7. The debarker of claim 6 wherein each tool holder has a guide shoe intermediate its length and adjacent the central opening; said shoe being adapted to slidably engage the surface of said tree bole.

* * * * *

UNITED STATES PATENT OFFICE
CERTIFICATE OF CORRECTION

Patent No. 3,704,733      Dated December 5, 1972

Inventor(s) Bruce John McColl

It is certified that error appears in the above-identified patent and that said Letters Patent are hereby corrected as shown below:

Column 13, line 10, "picotally" should be -- pivotally --.

Signed and sealed this 12th day of June 1973.

(SEAL)
Attest:

EDWARD M. FLETCHER, JR.
Attesting Officer

ROBERT GOTTSCHALK
Commissioner of Patents